United States Patent [19]

Tanis

[11] Patent Number: 5,387,153
[45] Date of Patent: Feb. 7, 1995

[54] ROTARY COMBINE

[75] Inventor: Dale R. Tanis, Naperville, Ill.

[73] Assignee: Case Corporation, Racine, Wis.

[21] Appl. No.: 43,256

[22] Filed: Apr. 6, 1993

[51] Int. Cl.⁶ .......................... A01F 7/06; A01F 12/10
[52] U.S. Cl. ............................................. 460/68; 460/70
[58] Field of Search .............................. 460/70, 68, 63; 56/14.6

[56] References Cited

U.S. PATENT DOCUMENTS

| | | |
|---|---|---|
| 3,537,460 | 11/1970 | Van Buskirk . |
| 3,626,472 | 12/1971 | Rowland-Hill . |
| 3,828,794 | 8/1974 | Gochanour et al. . |
| 4,148,323 | 4/1979 | McMillen et al. . |
| 4,250,896 | 2/1981 | Wagstaff et al. . |
| 4,344,442 | 8/1982 | Torland et al. . |
| 4,535,787 | 8/1985 | Underwood . |
| 4,900,290 | 2/1990 | Tanis . |
| 5,145,462 | 9/1992 | Tanis et al. . |
| 5,257,959 | 11/1993 | Tanis .................................. 460/70 X |

*Primary Examiner*—Terry Lee Melius
*Attorney, Agent, or Firm*—Rudnick & Wolfe

[57] ABSTRACT

A rotor assembly for a rotary combine having an anti-wrap blade assembly which acts in combination with an impeller blade assembly to direct material outwardly and rearwardly relative to the longitudinal axis of the rotor assembly. The anti-wrap blade assembly includes a plurality of flights arranged at a foremost end of the rotor assembly in equally spaced relation about the rotational axis of the rotor assembly. Each blade of the anti-wrap assembly has a leading edge lying in a plane extending generally normal to the rotational axis and includes a material engaging surface which has a generally concave shape configuration extending rearwardly from the leading edge of the blade for directing materials outwardly and rearwardly from the rotational axis of the rotor. The rotor assembly further includes an anti-wind assembly for inhibiting debris and other foreign matter from contaminating a bearing assembly which rotatably mounts one end of the rotor assembly.

11 Claims, 4 Drawing Sheets

ROTARY COMBINE

FIELD OF THE INVENTION

The present invention generally relates to agricultural combines and, more particularly, to an a rotary combine including a rotor assembly having inlet flighting at a forward end thereof for enhancing movement of crop materials introduced to the rotor assembly while conjointly inhibiting crop materials from wrapping about a bearing assembly provided at the front of the rotor assembly.

BACKGROUND OF THE INVENTION

A common and well-known form of harvesting machine is a rotary combine. Rotary combines are available in various designs and models to perform the basic functions of harvesting, threshing, and cleaning of grain and other crop materials.

A typical combine includes a crop harvesting apparatus which reaps planted grain stalks and then feeds the groin stalks to a separating or threshing apparatus. The grain stalks or other crop harvested in the field is rearwardly moved from the crop harvesting apparatus and introduced for threshing to a rotor assembly by a feeder mechanism.

In an rotary combine, the rotor assembly includes a generally tubular rotor casing mounted on the combine frame and a driven rotor disposed within the casing in coaxial relationship therewith. The rotor is supported at opposite ends by front and rear bearing assemblies. The rotor and casing have cooperating threshing instrumentalities arranged thereon for separating grain from material other than grain. In such a combine, which has been available for a number of years, the crop material is threshed several times repeatedly, but gently, as it spirals around the rotor and passes through openings in the rotor casing.

The ability to transfer crop materials from the feeder mechanism to the rotor assembly is a key factor in efficient and effective combine operations. Many rotary combines rotors include an impeller blade assembly comprised of a series of impeller blades arranged at a forward end of the rotor. During a harvesting operation, the rotating impeller blades modify the generally linear movement of the crop materials received from the feeder assembly into whirling circulatory movement in a rearward and outward direction relative to the axis of rotor rotation. As will be appreciated, those crop materials introduced from the feeder mechanism to the impeller assembly proximate to the rotary center of the impeller blades are not induced to move radially outward under the same influence as those crop materials which are introduced to the impeller assembly at a greater distance from the axis of rotation of the rotor assembly.

When rotary combines are used in certain long-stemmed leguminous or grassy crops, such as windowed perennial or annual rye grass, clover, and bent grass, there is a potential for such grassy crops to extend partially into the impeller blade assembly while the remainder of such crop materials remains partially engaged with the feeder mechanism. Such materials naturally tend to move toward the axis of rotation of the rotor assembly and some materials ultimately tend to wrap about the front rotor bearing assembly.

As will be appreciated, when the crop material becomes tightly wrapped about the rotor bearing assembly, it impairs the operational characteristics of the combine. Crop materials wrapping about the rotor bearing assembly have been known to destroy the bearing assembly and, ultimately, stall the engine of the combine. To return the combine to operation requires such crop materials to be cleaned and cleared from the bearing assembly area. To clean and clear this problem, of course, requires valuable time which is at a premium in crop harvesting operations. Moreover, when the bearing assembly is damaged, repair or replacement of the bearing assembly consumes still more valuable harvesting time. As the crop materials wrap about the forward rotor bearing assembly, the engine on the combine is required to work harder to achieve the same results. Accordingly, wrapping of crop material about the rotor bearing adversely affects combine efficiency.

Numerous designs have been proposed to maintain crop materials from becoming entangled with the front rotor bearing assembly. Most of such designs include an anti-wrap casting having any number of various configurations and which is fixedly secured to a front support member extending transversely across an open end of the rotor assembly. It has been found, however, that a scissor-like action is created between the crop materials being moved by the rotor impeller blades and such a casting. This scissor-like action of the materials against the outer surface of the casting quickly causes wear, and ultimately, requires replacement of the anti-wrap casting. As will be appreciated, the provision of a stationary casting at a forward of the rotor does not enhance or impart either outward or rearward material movement or activity at the center of the rotor during the harvesting operation.

Thus, there is a need and a desire for an anti-wrap assembly which promotes material movement at the center of the rotor so as to move the crop materials rearwardly and outwardly away from the centerline of the rotor assembly thereby promoting combine efficiency while inhibiting such materials from wrapping about the front rotor bearing assembly.

SUMMARY OF THE INVENTION

In view of the above, and in accordance with the present invention, there is provided a rotor assembly for a rotary combine including a rotor having an anti-wrap blade assembly which acts in combination with an impeller blade assembly to direct material outwardly and rearwardly relative to the longitudinal axis of the rotor assembly. The anti-wrap blade assembly includes a plurality of blades or flights which rotate with the rotor and cooperate with the impeller blades for moving crop materials outwardly and away from the front and center of the rotor. The blades of the anti-wrap assembly are arranged at a foremost end of the rotor in equally spaced relation about the rotational axis of the rotor. Each blade of the anti-wrap assembly has a leading edge lying in a plane extending generally normal to the rotational axis of the rotor. Each blade of the anti-wrap assembly has a material engaging surface with a generally concave shape in the direction of rotor rotation. The blades of the anti-wrap blade assembly are arranged in a predetermined relation and contact with the blades of the impeller blade assembly to direct materials outwardly and rearwardly from the rotational axis of the rotor.

In a preferred form of the invention, each blade of the anti-wrap blade assembly is further provided with an outer edge which is configured such that the blades of the anti-wrap blade assembly develops a a rotary trace upon their rotation. The trace of the anti-wrap assembly has a larger diameter at a forward end thereof than at a rearward end to advantageously promote rearward axial movement of the crop materials relative to the rotor.

Unlike heretofore known anti-wrap devices, the dynamics of the anti-wrap assembly of the present invention promotes movement of crop materials away from the axis of rotation of the rotor. Accordingly, grassy, elongated crop materials are induced with movement extending away from the rotor bearing assembly which supports a front end of the rotor. The blade design of the anti-wrap flighting causes materials to "spin-off" the material engaging surface of each blade thereby furthermore promoting outward and rearward material movement.

The rotor is provided with a shaft that is journalled, at a forward end, in a bearing assembly. The bearing assembly includes a housing which supports a bearing that rotatably accommodates a free end of the shaft. Notably, the bearing housing and a forward end of the rotor assembly include anti-wind structure for forcibly moving debris away from the bearing thus prolonging its useful life.

Numerous other features and advantages of the present invention will become readily apparent from the following detailed description, the accompanying drawings, and the appended claims.

DETAILED DESCRIPTION OF THE PRESENT INVENTION

Figure 1:
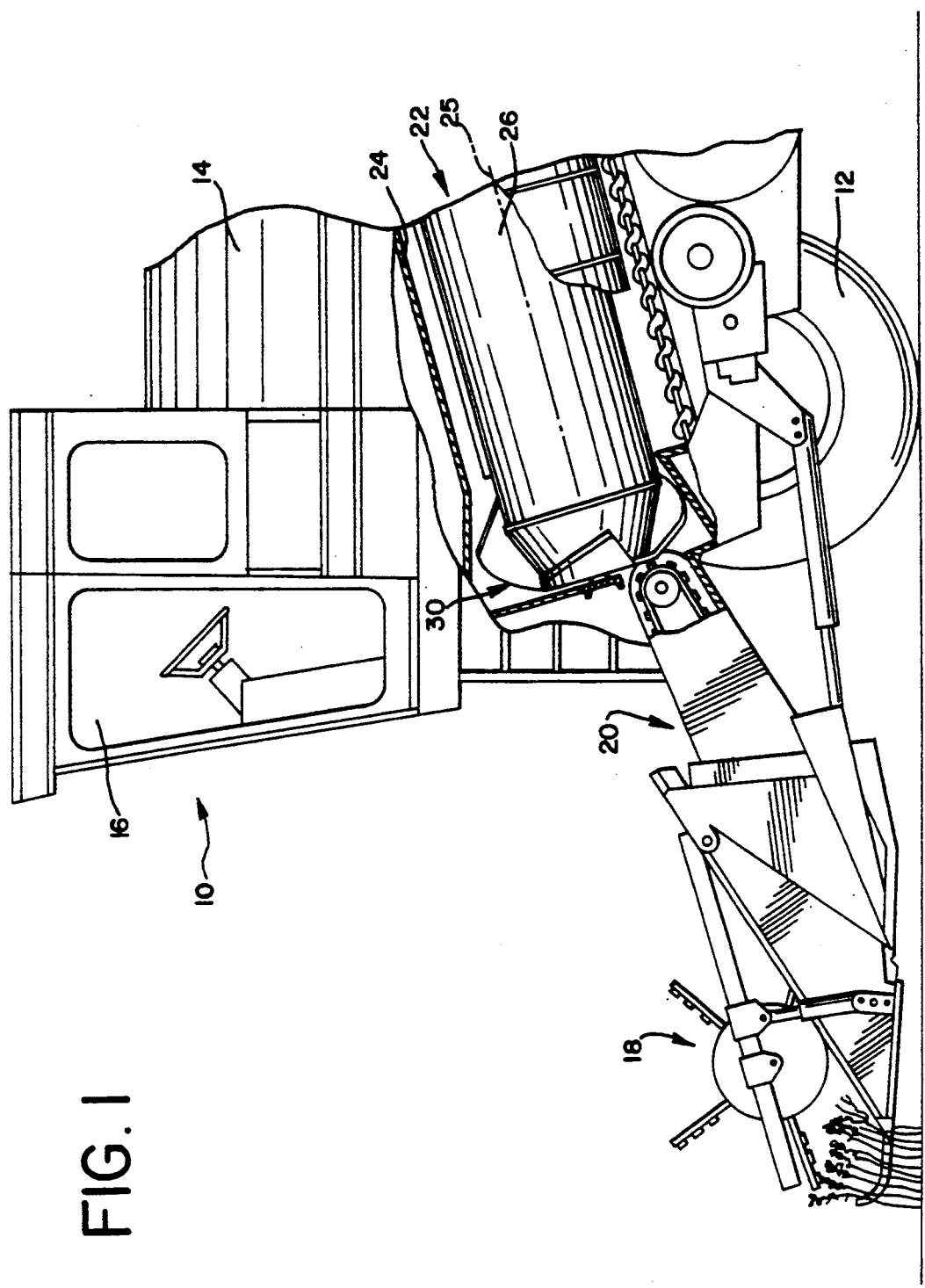
FIG. 1 is a side elevational view, partly in section, of an a rotary type combine with a major portion of one side wall being broken away to reveal a rotor assembly embodying features of the present invention.

While the present invention is susceptible of embodiment in various forms, there is shown in the drawings and will hereinafter described, a preferred embodiment of the invention with the understanding that the present disclosure is to be considered as an exemplification of the invention which is not intended to limit the invention to the specific embodiment illustrated.

Referring now to the drawings, wherein like reference numerals indicate like parts throughout the several views, there is shown in FIG. 1 a self-propelled combine 10 having a pair of front drive wheels 12 and which further includes a pair of rear steerable wheels (not shown). The combine 10 further includes a body 14 having an interconnected supporting structure or frame which defines an operator station 16.

The combine is operatively powered by an engine (not shown) suitably supported and housed within body 14 and which provides driving power for the combine. The transfer of rotation and power from the engine to various driven components of the combine is of a conventional nature and could include fixed or variable belt or chain drives which are not shown or described but are well known in the art.

At its front or forward end, the combine is provided with a crop harvesting apparatus or header 18 which can be of any suitable design. The crop harvesting apparatus 18 cuts and directs crop materials toward a crop feeder mechanism 20. The crop feeder mechanism preferably includes a conventional chain and slat conveyor that upwardly and rearwardly moves crop material in a crop layer or mat toward a rotor assembly 22 which acts to separate and thresh grain from materials other than grain.

The rotor assembly 22 is conventionally supported inside the body 14 of the combine 10. As is the case with rotary combines of the type hereinafter under consideration, the rotor assembly 22 embodies crop threshing and separating means in a single unit. More specifically, the rotor assembly 22 includes a generally tubular rotor casing or housing 24 mounted in a fore- and-aft direction in the body 14 of the combine along an elongated axis 25 and a generally cylindrical rotor 26 arranged in a generally coaxial relationship within the casing 24. As viewed from the front of the combine, the direction of rotation of the rotor 26 is counter-clockwise.

Figure 2:
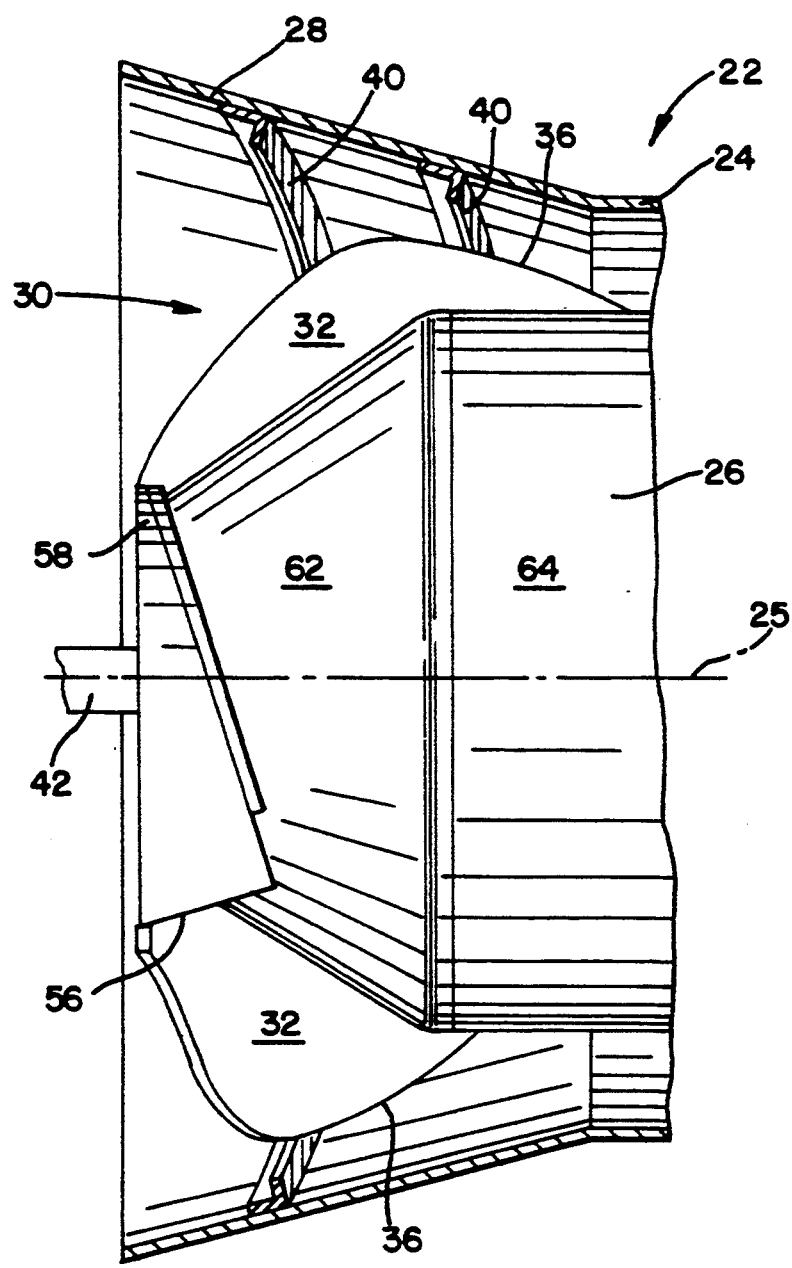
FIG. 2 is a fragmentary and enlarged side elevational view of a rotor assembly embodying features of the present invention.

At its forward end, and as seen in FIG. 2 in the illustrated embodiment of the invention, the rotor casing 24 has an open-ended transition section 28 which may be regarded as a forward extension of the casing 24. The open end of the transition section 28 is arranged in crop-receiving relation with the feeder mechanism 20 (FIG. 1). In the preferred embodiment, the transition section 28 is provided with an outwardly flared funnel-like frusto-conical configuration which is suitably secured to the body of the combine. As illustrated, the transition section 28 has a decreasing cross-sectional area in a downstream direction extending between fore-and-aft ends thereof. The configuration of the transition section 28 functions to "funnel" the crop materials axially rearward through the rotor casing.

At its forward end, rotor 26 includes an impeller blade assembly 30 for drawing air and crop materials into and through the rotor assembly 22. The impeller blade assembly 30 is comprised of a plurality of substantially identical impeller blades 32 which are secured to the rotor 26 and are equally spaced relative to each other. In the illustrated embodiment, two impeller blades 32 comprise the impeller assembly 30. It should be appreciated, however, that the impeller assembly 30 can comprise more than two blades without detracting or departing from the spirit and scope of the present invention.

The blades 32 of the impeller assembly 30 may take different shapes depending upon the particular manufacturer and other criteria. Each blade has a material engaging surface extending from the rotor 26 and which terminates at an outer edge 36 which has a declining slope in the downstream direction of the rotor 26. As will be appreciated, the trace generated by the impeller blades 32 upon rotation of the rotor approximates a cone frustum having a slant angle which is substantially equal to the slant angle of the frusto-conical transition section 28 and so that a small annular clearance or opening is defined between the outer edge 36 of the impeller blades 32 and the inner surface of the transition section 28. It is through this annular clearance or opening that crop material is moved axially rearward toward threshing instrumentalities on the rotor assembly.

As shown in FIG. 2, a plurality of spiral transport vanes 40 are supported on an internal wall surface of the transition section 28. A portion of each transport vane 40 extends into the annular opening or space to facilitate axial rearward movement of crop material through the transition section 28 of the rotor assembly.

Figure 3:
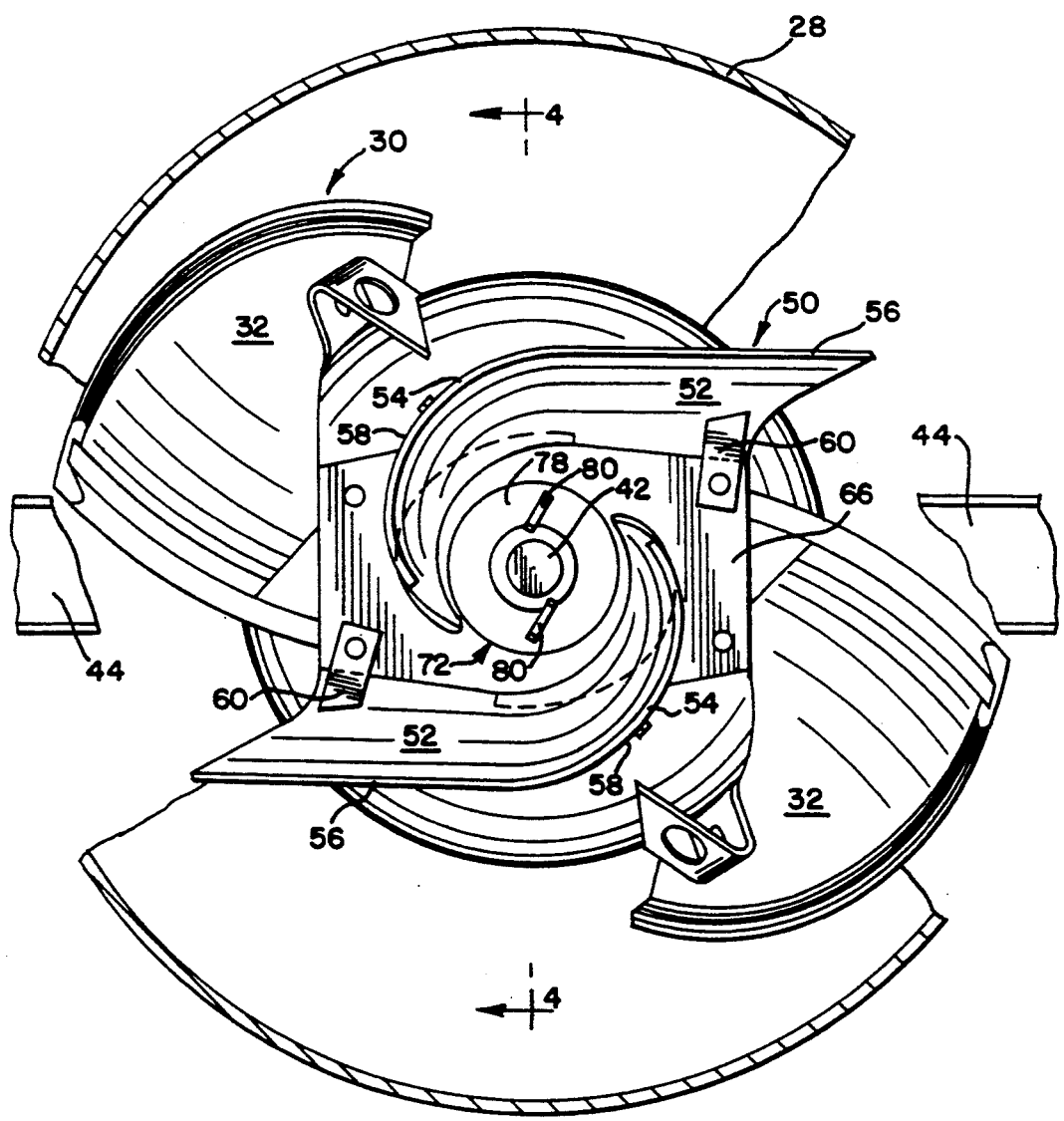
FIG. 3 is an enlarged front elevational view of the rotor assembly of the present invention.
Figure 4:
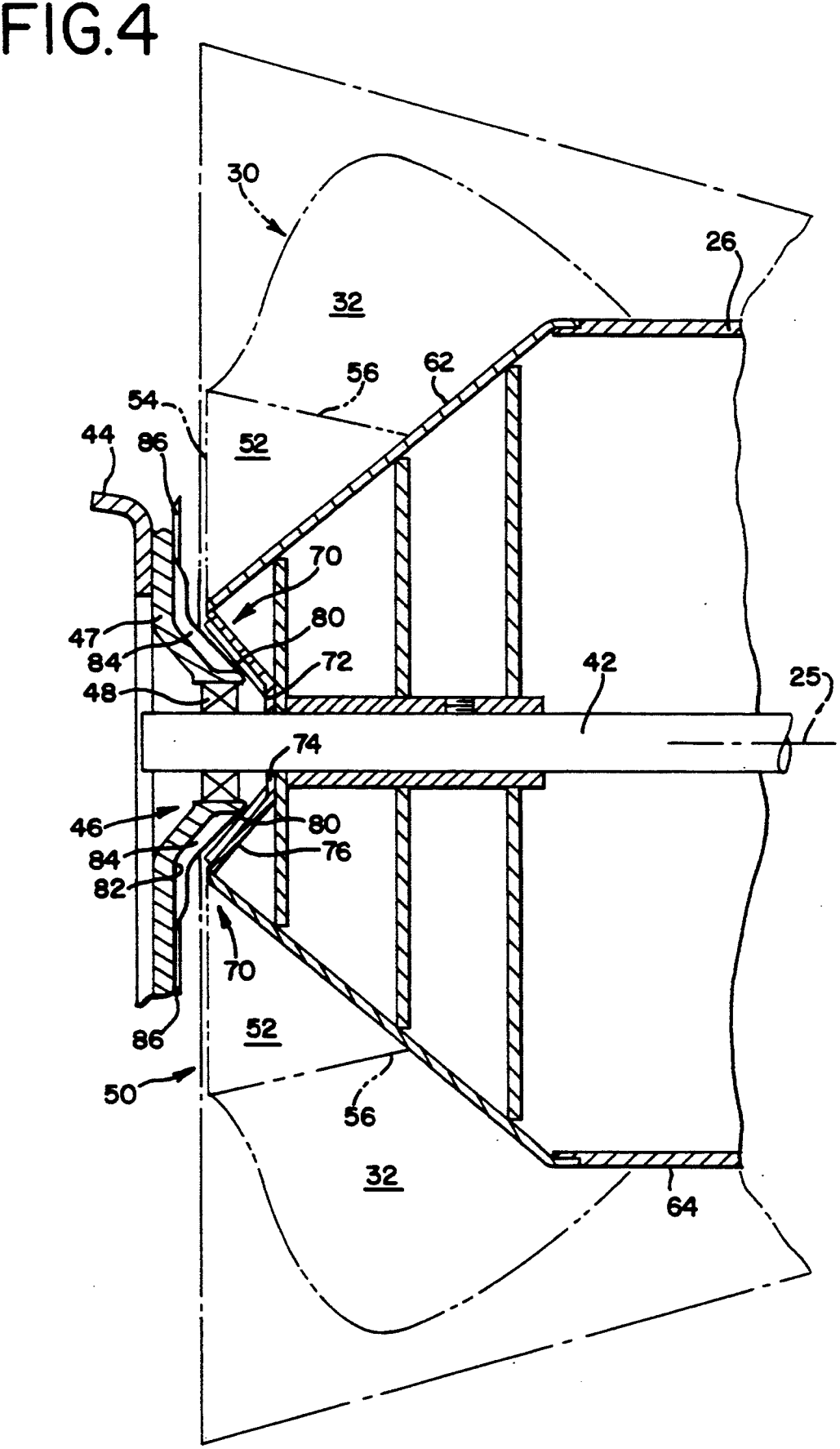
FIG. 4 is a fragmentary longitudinal sectional view taken along line 4—4 of FIG. 3.

As mentioned, the rotor 26 is suitably supported at opposite ends for rotation. Rotor 26 includes a shaft 42 which extends from the forward end of the rotor 26 and is axially aligned with the elongated axis 25. As shown in FIGS. 3 and 4, a transverse rotor support 44 is secured to the combine frame and extends across an open end of the rotor assembly 22. A bearing assembly 46 is mounted on the support 44. Bearing assembly 46 includes a bearing housing 47 having a suitable bearing 48 captively arranged therewithin and which rotatably accommodates and support the forward end of shaft 42 of the rotor 26.

A salient feature of the present invention concerns an infeed or anti-wrap blade assembly 50 which is arranged in combination and for rotation with the impeller assembly 30. The purpose of the infeed flight assembly 50 is to shield the bearing assembly 46 and inhibit crop materials from becoming entangled about the forward end of shaft 42 of the rotor 26 thereby prolonging the useful life of the bearing 48.

In its preferred form, the anti-wrap assembly 50 comprises a plurality of substantially identical blades or flights 52 which are equally spaced relative to each other and are arranged in a predetermined relationship relative to the blades 32 of the impeller assembly 30. As shown, the number of blades 52 of the infeed flight assembly 50 equals the number of blades 32 of the impeller assembly 30. In the illustrated form of the invention, the blades 52 of the infeed flight assembly 50 are mounted to the rotor independent of the impeller blades 32. It is within the scope of the present invention, however, that the flighting of the anti-wrap blade assembly 50 be formed as an integral part of the impeller blades 32 of the impeller assembly 30.

Whether integrally formed with the impeller blades 32 or as shown, each blade 52 of assembly 50 has a leading edge 54 lying in a plane extending generally normal to the rotational axis 25 of the rotor. An outer edge 56 of each anti-wrap blade 52 extends rearwardly from the leading edge 54. As it extends rearwardly from the leading edge, the outer edge 56 preferably angles relative to the transport vanes 40 on the transition housing 28 and extends diagonally rearward relative to the elongated axis 25 of the rotor. The outer edge 56 of each blade has a declining slope in the downstream direction of the rotor 26. As noted from FIG. 5, the trace generated by the outer edge 56 of the anti-wrap blades 52 upon rotation of the rotor approximates a cone frustum having a slant angle which approximates the slant angle of the frusto-conical transition section 28. The angled configuration of the outer edge 56 of blades 52 induces rearward movements to the crop materials engaging therealong.

As shown in FIG. 3, each blade 52 of assembly 50 further includes a material engaging surface 58. As shown, surface 58 is preferably configured with a generally concave profile in the direction of rotor rotation so that the crop materials tend to "spin-off" therefrom. In the design wherein the blades 52 of the anti-wrap assembly 50 are fabricated separately from the blades 32 of the impeller assembly 30, suitable braces or supports 60 connect and secure the blades 52 to the rotor 26 for rotation therewith.

In a preferred form of the invention, the rotor 26 is a hollow elongated structure having shaft 42 extending coaxially therethrough and beyond with an inlet section 62 at a forward end thereof and a threshing section 64 extending rearwardly therefrom. As shown in FIG. 4, the inlet section 62 has a frusto-conical shape defining an outer surface which promotes outward movement of the crop materials impinging thereagainst. The conical shape of the inlet section 62 is configured such that the foremost end of section 62 has a smaller diameter than the rearward end thereof. In the illustrated embodiment, the inlet section 62 is attached to a foremost end of the threshing section 64. The threshing section 64 preferably has a generally constant cylindrical configuration extending along the length thereof.

The anti-wrap blades 52 of the inlet feed flighting assembly 50 are preferably arranged at the foremost end of the inlet section 62 of rotor 26. In a most preferred form of the invention and as shown in FIG. 3, a plate 66 facilitates attachment and positioning of each anti-wrap flight or blade 52 onto the inlet section 62 of the rotor 26 in a predetermined relation to a respective blade 32 of the impeller blade assembly 30.

In line with the present invention, and as best illustrated in FIG. 4, an anti-wind assembly 70 closes the forward open end of the rotor 26 and coacts with the stationary bearing assembly 46 to inhibit debris from interfering with proper operation of the bearing assembly. The anti-wind assembly 70 is connected to rotate with rotor 26 and includes a cup shaped member 72 which is configured to allow shaft 42 to pass therethrough.

As shown in FIG. 4, the cup shaped member 72 includes a base 74 with a continuous frusto-conically shaped wall 76 extending away from the base 74. Notably, the wall 76 of member 72 has a smaller outside diameter where wall 76 and base 74 are joined than at an open end of member 72. The conical surface of member 72 facing bearing 48 has a plurality of anti-wind vanes 80 attached thereto. In the illustrated embodiment, the vanes 80 extend generally parallel to wall 76 of member 72 and extend radially outwardly away from and have a slant back design (FIG. 4) relative to the rotational axes 25 of rotor 26. As shown in FIG. 3, preferably two anti-wind vanes 80 are attached to member 72.

As shown in FIG. 4, the stationary bearing housing 47 is configured to compliment and coact with the shape of the cup shaped member 72 of the anti-wind assembly 70. Notably, the stationary bearing housing 47 is provided with a surface 82 that rearwardly projects toward and generally parallels wall 76 of member 72. Surface 82 of housing 47 is provided with a series of vanes 84 which cooperate with the vanes 80 of the anti-wind assembly 70 to direct debris and other foreign materials away from the bearing 48 thus prolonging the useful life of the bearing. In a most preferred form of the invention, rotor support 44 includes a plurality of vanes 86 thereon. Vanes 86 on support 44 are configured to receive debris and other foreign materials from the vanes 84 on the bearing housing 47 and serve to direct such materials radially outwardly from the bearing assembly 46.

During combine operation, the combine 10 is driven across a field of crop materials and the header assembly 18 severs the crop materials toward a lower end thereof. The crop materials are transferred to the feeder mechanism 20 which rearwardly moves the crop materials and, ultimately, discharges the materials into the open end of the rotor assembly 22. The crop materials are introduced to the rotor assembly 22 from the feeder mechanism 20 in a conventional undershot manner.

Those crop materials which are introduced from the feeder mechanism 20 to the rotor assembly 22 toward the rotational axis 25 normally have little momentum upon their initial introduction. The dynamics of the infeed flight assembly 50 of the present invention, however, immediately engages those materials which are introduced proximate to the rotational center of the rotor assembly 22 and advantageously imparts circular movement thereto.

As the crop materials are introduced, the rotating blades 52 of the infeed flight assembly 50 immediately impart outward and rearward movement to the crop materials. The concave configuration of the blades 52 allows the crop materials to spin-off the material engaging surfaces 58 and move rearwardly and outwardly toward the impeller assembly 30. Notably, the blades 52 of the infeed flight assembly are arranged in a predetermined relation relative to the impeller blades 32 of the impeller assembly 30. Accordingly, as the crop materials spin-off the blades of the infeed flight assembly, such materials are received by and are furthermore outwardly directed by the impeller blades 32 of the impeller assembly 30. The outward advancement of the crop materials move the materials toward the vanes 40 on the inner surface of the transition housing and, ultimately, rearwardly through the rotor assembly 22.

As schematically illustrated in FIG. 4, the outer sloping edges 56 of the blades 52 of the anti-wrap assembly 50 trace a frusto-conical configuration upon rotation of the rotor assembly 22. The trace of the outer edge 56 of the blades 52 is substantially similar to the trace of the blades 32 of the impeller assembly 30. As will be appreciated, configuring the blades 52 of the infeed flighting assembly 50 in such a manner, will promote outward and rearward movement of the crop materials away from the rotational axis 25 of the rotor assembly.

An important advantage of the infeed flight assembly 50 is the ability to move crop materials outwardly and away from the front rotor bearing assembly 46 of the rotor assembly 22. The rotating movement of the anti-wrap blades 52 inhibits crop materials from becoming entangled about the shaft 42 of the rotor 26. The material engaging surface 58 of the blades 52 imparts outward circular motion to those crop materials proximate to the inlet center of the rotor 26 and moves the crop material toward the impeller assembly 30 which imparts further outward movement to such crop materials.

In the preferred embodiment, anti-wind assembly 70 furthermore protects the bearing 48 of assembly 46 against debris and foreign material drawn theretoward during operation of the rotor assembly 22. As the anti-wind assembly 70 rotates with the rotor 26, the vanes 80 cooperate with the vanes 84 on the bearing assembly 46 to forcibly move debris radially outward away from the axis 25 of the rotor. In a most preferred form of the invention, the debris forcibly moved outwardly by the anti-wind assembly 70 is delivered to the vanes 86 on the support 44 and directed away from the bearing 47 to prolong its useful life. The dynamics of the infeed flight assembly 50 furthermore eliminates the scissor-like action of the crop materials against a normally stationary surface of a fixed anti-wind casting since the blades 52 move in a circular fashion and impart circumferential motion to the materials. The ability to add circular motion proximate to the inlet center of the crop materials as they are initially introduced to the rotor assembly 22 enhances the efficiency of the combine by promoting rearward movement of crop materials through the rotor whereat such materials are threshed and separated as they spiral gently about the rotor assembly 22.

From the foregoing, it will be observed that numerous modifications and variations can be affected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appendant claims all such modifications as fall within the scope of the claims.

What is claimed is:

1. A rotary combine comprising:
   an elongated generally cylindrical casing provided at a forward end with a transition section designed for endwise reception of crop materials;
   a rotor arranged substantially within said casing and defining an elongated axis of rotation, said rotor being rotatably supported at opposite ends and includes a shaft axially aligned with said rotational axis, said shaft being received for rotation in a stationary bearing assembly;
   an impeller assembly attached to the forward end of the rotor, said impeller assembly including a plurality of equally spaced impeller blades for engaging and directing crop materials outwardly and rearwardly relative to the elongated axis of rotation of the rotor, with each impeller blade having a material engaging surface beginning at a forward end of the rotor and sloping rearwardly of the rotor; and
   an anti-wrap blade assembly arranged at the forward end of the rotor in connection and for rotation with said impeller assembly, said blade assembly comprising a plurality of blades equally spaced about said rotational axis, each blade of said blade assembly having a leading edge lying in a plane extending generally normal to the rotational axis and a material engaging surface having a generally concave shaped configuration beginning at the forward end of the rotor and extending rearwardly of the rotor, and wherein, in the direction of rotor rotation, the material engaging surface of each blade of the anti-wrap blade assembly begins substantially closer to the axis of rotation of the rotor than does the material engaging surface of the impeller blades and is configured to extend about the axis of the rotor such that crop materials are removably directed away from the area of the shaft and toward the material engaging surfaces of the impeller blades to inhibit crop materials from interfering with the stationary bearing assembly.

2. The combine according to claim 1 wherein said rotor includes an elongated structure having an open forward end, and wherein an anti-wind assembly closes the open end of the rotor and coacts with said bearing assembly to direct debris outwardly relative to the rotational axis of the rotor.

3. The combine according to claim 1 wherein the material engaging surface of each blade of the anti-wrap blade assembly terminates at an outer edge that extends rearwardly from the leading edge of said anti-wrap blade assembly, and wherein the outer edge of said anti-wrap blade extends diagonally rearward relative to the axis of the rotor.

4. The combine according to claim 1 wherein the material engaging surface of each blade of the anti-wrap blade assembly terminates at an outer edge which is configured such that the blades of the anti-wrap assembly develop a frusto-conical trace upon their rotation, said trace having a larger diameter at a forward end thereof than at a rearward end to promote rearward axial movement of the crop materials relative to the rotor.

5. A rotary combine comprising:

a mobile frame;

an elongated generally cylindrical casing supported by said frame;

a threshing rotor arranged substantially within said casing and defining an elongated axis of rotation, said rotor being supported at opposite ends by said frame and including a shaft journalled within a bearing at a forward end of said rotor;

an impeller assembly attached to a forward end of said rotor, said impeller assembly including a plurality of equally spaced impeller blades for drawing crop materials into the rotor for threshing, each impeller blade having a material engaging surface beginning at a forward end of the rotor and sloping rearwardly thereof; and inlet feed flighting arranged at a forward end of the rotor in combination and for rotation with said impeller assembly, said inlet feed flighting including two or more inlet feed flights equally spaced about the rotational axis of said rotor, with each inlet feed flight including a leading edge lying in a plane extending generally normal to the axis of rotor rotation at a foremost end of said rotor and a material engaging surface having a generally concave configuration extending rearwardly from the leading edge of the flighting, and wherein, in the direction of rotor rotation, the material engaging surface on the inlet feed flights initially begins substantially closer to the axes of rotor rotation than does the beginning of the material engaging surface area of each impeller blade and whereby the remaining configuration of the material engaging surfaces on the inlet feed flighting enhances movement of crop materials away from the center of the rotor and toward the material engaging surfaces on the impeller blades thereby inhibiting the crop materials from interfering with said bearing.

6. The combine according to claim 5 wherein said elongated casing includes a frusto-conical transition section at a forward end thereof for receiving crop materials, said transition section including a series of spiral transport vanes arranged about the inner surface thereof.

7. The combine according to claim 6 wherein the material engaging surface of each impeller blade terminates in a rearwardly slanting outer edge which forms a trace extending generally parallel to the inner surface of the transition section upon rotation of the rotor.

8. The combine according to claim 5 wherein the material engaging surface of each inlet flight of said feed flighting terminates in a rearwardly slanting outer edge disposed a greater radial distance from the axis of rotation at the leading edge of each flighting than toward a rear end of each flighting to form a frusto-conical trace to enhance rearward crop material advancement upon rotation of the rotor.

9. A rotary combine comprising:

a mobile frame;

an elongated generally cylindrical rotor casing provided at a forward and with a frusto-conically shaped transition section designed with an open forward end for endwise reception of crop materials;

a stationary support member fastened to the frame and extending transversely across the open end of said transition section;

a threshing rotor arranged substantially within said casing and defining an elongated axis of rotation, said rotor having a shaft extending from a forward end thereof and axially aligned with the rotational axis;

a bearing assembly carried by said support member, said bearing assembly including a bearing housing fastened to said support member with a bearing housed therewithin for rotatably accommodating said shaft;

an impeller assembly including a series of impeller blades attached to a forward end of said rotor, each impeller blade having a material engaging surface beginning at a forward end of the rotor and sloping rearwardly of the rotor for directing the crop materials received by the transition section rearwardly and outwardly relative to said rotor; and an inlet feed flight assembly cooperatively arranged relative to and for rotation with the impeller assembly at the forward end of the rotor for moving crop materials outwardly and away from the axis of rotation of the rotor thus inhibiting crop materials from entangling with said bearing assembly, said inlet feed flight assembly including a plurality of blade-like flights equally spaced about the rotational axis of the rotor, each flight having a leading edge arranged at a foremost edge of said rotor and a concave shaped material engaging surface extending axially rearward from the leading edge of a respective flight, and wherein, in the direction of rotor rotation, the material engaging surface of each flight of the flight assembly begins substantially radially closer to the axis of rotation of the rotor than does the material engaging surface of the impeller blades, and whereby the configuration of the material engaging surface on the flights permits the infeed flight assembly to engage and promote outward and rearward movement of the crop materials introduced toward the center of the rotor toward the material engaging surfaces of the impeller blades, with the material engaging surface of each flight terminating in a rearwardly extending outer edge configured to establish a frusto-conical trace upon rotation of the rotor to rearwardly move crop materials relative to the rotor.

10. The combine according to claim 9 further including an anti-wind assembly having a plurality of anti-wind vanes mounted for rotation with said rotor and arranged in combination with said bearing housing of said bearing assembly for moving debris and the like radially outwardly relative to the axis of the rotor.

11. The combine according to claim 10 wherein the outer edge of each flight is arranged a further distance from the rotational axis of the rotor at the leading edge of the flight than at a rearward location on the flight.

* * * * *